United States Patent
Rapp

(10) Patent No.: US 7,073,903 B2
(45) Date of Patent: Jul. 11, 2006

(54) GLASSES AND FIXING DEVICE

(75) Inventor: Klaus Rapp, Icking (DE)

(73) Assignee: Rodenstock GmbH, Munich (DE)

( * ) Notice: Subject to any disclaimer, the term of this patent is extended or adjusted under 35 U.S.C. 154(b) by 211 days.

(21) Appl. No.: 10/478,326

(22) PCT Filed: May 16, 2002

(86) PCT No.: PCT/DE02/01764

§ 371 (c)(1),
(2), (4) Date: Jun. 7, 2004

(87) PCT Pub. No.: WO02/095482

PCT Pub. Date: Nov. 28, 2002

(65) Prior Publication Data

US 2006/0082722 A1   Apr. 20, 2006

(30) Foreign Application Priority Data

May 21, 2001  (DE)  ............................... 101 24 966

(51) Int. Cl.
*G02C 1/02*   (2006.01)
(52) U.S. Cl. .................... 351/110; 351/140; 351/144

(58) Field of Classification Search ................. 351/110, 351/140–141, 144–146
See application file for complete search history.

(56) References Cited

U.S. PATENT DOCUMENTS

| 5,073,020 | A | 12/1991 | Lindberg et al. ............ 351/106 |
| 5,684,559 | A | 11/1997 | Lin ............................. 351/110 |
| 6,024,445 | A | 2/2000 | Conner et al. .............. 351/110 |
| 6,447,117 | B1 * | 9/2002 | Estrada et al. .............. 351/110 |

FOREIGN PATENT DOCUMENTS

| EP | 0 561 763 | 9/1993 |
| WO | WO 00/29896 | 5/2000 |

* cited by examiner

*Primary Examiner*—Huy K. Mai
(74) *Attorney, Agent, or Firm*—Crowell & Moring LLP

(57) ABSTRACT

Spectacles comprise a bridge connecting two lenses, and side pieces mounted on the lenses for carrying spectacle bows, the lenses being connected to the side pieces and to the bridge by an attachment which comprises a U-shaped wire loop which is inserted into a bore in a lens and is secured by a plug in such manner that the wire is urged into positive engagement with axially extending grooves in a wall of the bore.

11 Claims, 1 Drawing Sheet

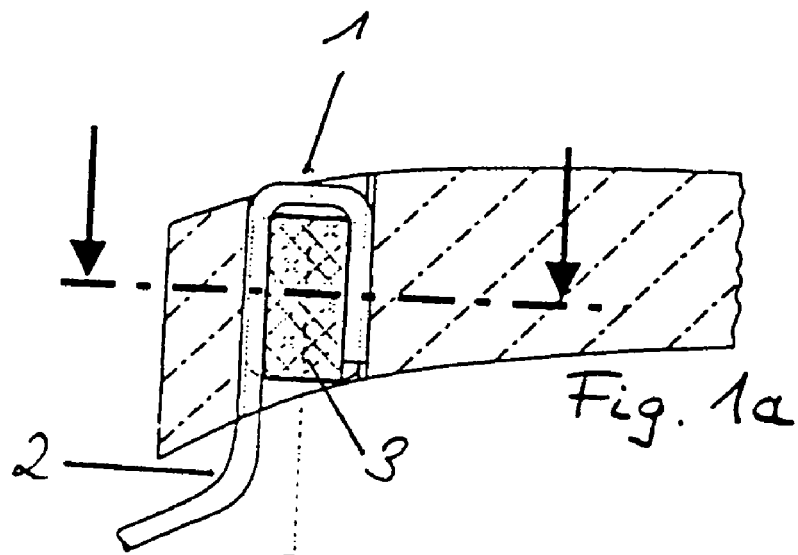
Fig. 1a
Fig. 1b
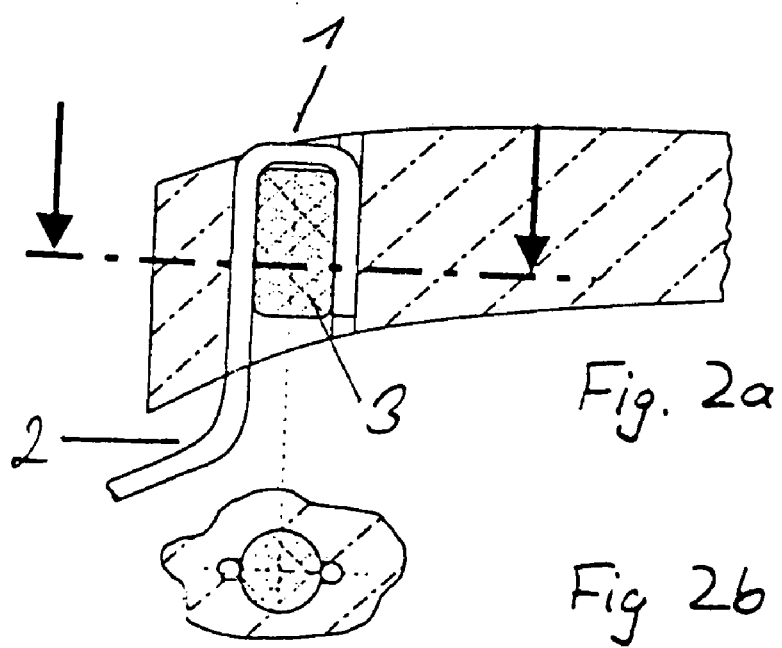
Fig. 2a
Fig 2b

GLASSES AND FIXING DEVICE

BACKGROUND OF THE INVENTION

The invention relates to spectacles and an attachment means.

Lenses and parts of a mount of spectacles are usually connected together by means of screws, threaded sleeves or a threaded pin with a nut. These are usually safeguarded against rotation by being secured in two bores, or by a pin in a notch at the periphery of a lens. A much applied method is that of inserting a wire bent to U-shape into oblong holes in the lens.

EP 0 561 763 A1 describes a lens holder for spectacles, comprising pairs of retaining pins which each engage in a respective bore in a spectacle lens and are supported by a mount portion of the spectacles, the retaining pins consisting of the free limbs of a U-shaped wire bracket which has a portion of its cross-piece that connects the two limbs together attached to the mount portion.

EP 1 024 390 A1 describes a mount for bored spectacles, comprising a bridge connecting two lenses, and brackets which each have a pin-shaped attachment element, the pin-shaped attachment elements each having a wing-shaped attachment region, and the spectacle lenses having corresponding slot-like (bead-shaped) notches disposed at a distanced from the extreme edge of the lens for stress-free, rotation-proof, and form-fitting engagement with the widened attachment regions.

Most of the attachment means known in the prior art require relatively difficult machining of the lenses. Furthermore, they are only insufficiently secure, for example by wire loops inserted in oblong holes.

SUMMARY OF THE INVENTION

An object of the invention to provide spectacles having a very small-sized attachment means which will nevertheless ensure a secure attachment of the lenses.

The object is achieved in accordance with the invention by at least one attachment means having a U-shaped wire loop which is inserted in a bore in the lens and is secured by a plug in such manner that the wire is urged into positive engagement with axially extending grooves in the wall of the bore.

The plug is preferably a plug of a synthetic material which additionally may be secured with the aid of an adhesive, if necessary.

The adhesive used is either a radiation-activated adhesive, an epoxy-reins based adhesive, a hot-melt-type adhesive, or a thermoplastic synthetic material.

A further object of the invention is to provide an attachment means of a very small size, which nevertheless ensures a secure attachment of the lenses.

The object is achieved in accordance with the invention by at least one attachment means having a U-shaped wire loop which is inserted in a bore in the lens and is secured by a plug in such manner that the wire is urged into positive engagement with axially extending grooves in the wall of the bore.

The plug is preferably a plug of a synthetic material which additionally may be secured with the aid of an adhesive, if necessary.

The adhesive used is either a radiation-activated adhesive, an epoxy-reins based adhesive, a hot-melt type-adhesive, or a thermoplastic synthetic material.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein:

FIGS. 1a and 1b are side and cross-sectional views showing a bore with grooves for partially receiving a looped wire in positive engagement; and FIGS. 2a and 2b are side and cross-sectional views showing a bore with grooves for completely receiving the looped wire in positive engagement.

DETAILED DESCRIPTION OF THE DRAWINGS

Attachment elements 1 are designed so that a loop 2 of thin wire is fitted into a specifically shaped bore close to the edge, and is secured against sliding out and is permanently fixed in a predetermined position by the insertion of a plug 3.

The plug is preferably a plug of a synthetic material which additionally may be secured with the aid of an adhesive, if necessary.

The adhesive used is either a radiation-activated adhesive, an epoxy-reins based adhesive, a hot-melt-type adhesive, or a thermoplastic synthetic material.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

The invention claimed is:

1. Spectacles comprising a bridge connecting two lenses, and side pieces mounted on the lenses for carrying spectacle bows, the lenses being connected to the side pieces and to the bridge by an attachment means;
   wherein at least one attachment means comprises a U-shaped wire loop which is inserted into a bore in a lens and is secured by a plug in such manner that the wire is urged into positive engagement with axially extending grooves in a wall of the bore.

2. Spectacles according to claim 1, wherein the plug is a plug of a synthetic material.

3. Spectacles according to claim 2, wherein the plug is secured by an adhesive.

4. Spectacles according to claim 3, wherein the adhesive is a radiation-activated adhesive, an epoxy-resin based adhesive, a hot-melt-type adhesive, or a thermoplastic synthetic material.

5. Spectacles according to claim 1, wherein the plug is secured by an adhesive.

6. Spectacles according to claim 5, wherein the adhesive is a radiation-activated adhesive, an epoxy-resin based adhesive, a hot-melt-type adhesive, or a thermoplastic synthetic material.

7. Attachment means for spectacles, with which spectacle lenses are connected to spectacles side pieces and to a spectacles bridge,
   wherein at least one attachment means comprises a U-shaped wire loop which is inserted into a bore in a lens and is secured by a plug in such a manner that the wire is urged into positive engagement with axially extending grooves in a wall of the bore.

8. Spectacles according to claim 7, wherein the plug is a plug of a synthetic material.

9. Spectacles according to claim 8, wherein the plug is secured by an adhesive.

10. Spectacles according to claim 7, wherein the plug is secured by an adhesive.

11. Spectacles according to claim 10, wherein the adhesive is a radiation-activated adhesive, an epoxy-resin based adhesive, a hot-melt-type adhesive, or a thermoplastic synthetic material.

* * * * *